United States Patent [19]

Suzuki et al.

[11] Patent Number: 5,001,407
[45] Date of Patent: Mar. 19, 1991

[54] SPEED CONTROL APPARATUS HAVING MEANS FOR CHANGING REFERENCE SIGNAL FOR ERROR SIGNAL, DEPENDING UPON LOAD APPLIED TO CONTROLLED DEVICE

[75] Inventors: Makoto Suzuki; Tomoaki Hattori, both of Nagoya, Japan

[73] Assignee: Brother Kogyo Kabushiki Kaisha, Aichi, Japan

[21] Appl. No.: 565,961

[22] Filed: Aug. 13, 1990

[30] Foreign Application Priority Data

Aug. 22, 1989 [JP] Japan .................................. 1-215401

[51] Int. Cl.$^5$ .............................................. H02P 1/22
[52] U.S. Cl. .................... 318/268; 318/811; 318/599
[58] Field of Search ............... 318/256, 257, 271, 280, 318/599, 602, 648; 388/811, 819

[56] References Cited

U.S. PATENT DOCUMENTS 3,624,475 11/1971 Smith .................................. 388/811
4,471,276 9/1984 Cudlitz .................................. 388/811
4,893,067 1/1990 Bhagwat et al. ...................... 318/599

Primary Examiner—William M. Shoop, Jr.
Assistant Examiner—Larry Moskowitz
Attorney, Agent, or Firm—Oliff & Berridge

[57] ABSTRACT

An apparatus for controlling an operating speed of an electrically controlled device including an electrically operated member. The apparatus includes an error signal generator for generating an error signal indicative of an error between an actual and a target value of the operating speed, a reference signal generator for generating a reference signal, a comparator for generating an output signal based on a result of comparison between the error and reference signals, and an energy control device for controlling an energy supplied to the electrically controlled device by controlling the duty cycle of an electric current applied to the electrically operated member such that the energy varies with the output signal of the comparator. A device is provided for changing the reference signal depending upon a load currently applied to the electrically controlled device.

19 Claims, 3 Drawing Sheets

SPEED CONTROL APPARATUS HAVING MEANS FOR CHANGING REFERENCE SIGNAL FOR ERROR SIGNAL, DEPENDING UPON LOAD APPLIED TO CONTROLLED DEVICE

BACKGROUND OF THE INVENTION

1. Field of the Invention

The present invention relates to an apparatus adapted to control an operating speed of an electrically controlled device including an electrically operated member such as an electric motor, by controlling the duty cycle of an electric current to be applied to the electrically operated member.

2. Discussion of the Prior Art

In various fields of art using an electrically controlled device which includes an electrically operated member, it is usually required to control the electrically operated member so as to maintain the operating speed of the electrically controlled device exactly at a desired or target value, irrespective of a variation in the operating conditions such as a load applied to the electrically controlled device, a line voltage used, and the ambient temperature. To this end, there is widely used a speed control apparatus for controlling the operating speed of the electrically controlled device, by regulating the duty cycle of an electric current to be applied to the electrically operated member. Generally, such a speed control apparatus includes (a) an error signal generator for generating an error signal indicative of an error between an actual and a target value of the operating speed of an electrically controlled device which includes an electrically operated member, (b) a reference signal generator for generating reference signal, (c) a comparator connected to the error and reference signal generators, for comparing the received error and reference signals with each other and thereby generating an output signal according to a result of the comparison, and (d) an energy control device connected between the comparator and the electrically operated member, for controlling an energy to be supplied to the electrically controlled device, by applying an electric current to the electrically operated member such that the duty cycle of the current is changed according to the output signal of the comparator.

An example of such a speed control device is a pulse-width modulation (PWM) device or pulse-duration modulation (PDM) device used for controlling a DC motor as an electrically operated member used in a certain electrically controlled device. This pulse-width or pulse-duration modulation device generally uses a triangle generator as the reference signal generator, and uses a phase-locked loop (PLL) circuit as part of the error signal generator. The triangle generator generates a reference signal having a triangular waveform. The PLL circuit receives an output signal of a rotary encoder disposed to detect the operating speed of the DC motor, and an output signal of an oscillator, and generates an output signal indicative of a difference between the frequencies of the output signals of the rotary encoder and oscillator. In this arrangement, the operating speed of the DC motor may be maintained at a desired level if the frequency of the oscillator is held constant, or controlled to a desired level if the frequency of the oscillator can be changed as desired.

The electrically controlled device whose speed is controlled by the speed control apparatus in question is not limited to an electrically operated device which includes an electrically operated member such as an electric motor. The speed control apparatus is equally applicable to any electrically controlled device which is driven by an energy other than an electric energy. For example, the apparatus is applicable to a hydraulically operated device such as a hydraulic cylinder, which is electrically controlled by a solenoid-operated valve or valves for regulating a hydraulic pressure or a rate of flow of a working fluid in the hydraulic system. In this case, the energy supplied to the hydraulic cylinder is controlled by regulating the hydraulic pressure or fluid flow rate, and the operating speed of the hydraulic cylinder can be controlled by regulating the duty cycle of an electric current to be applied to the solenoid-operated valve or valves, i.e., the electrically operated member.

The known duty cycle control apparatus as described above is not capable of sufficiently accurately controlling the operating speed of an electrically controlled device, where the load to be applied to the device is changed over a wide range. To assure exact regulation of the operating speed to a desired level, the duty cycle of an electric current to be applied to an electrically operated member of the device should be controlled over a range which corresponds to a possible range of variation in the load to be applied to the device. Namely, the range of regulation of the duty cycle should be commensurate with the range of variation of the load. However, it is difficult to maintain the optimum operating characteristics of the components of the speed control apparatus over the entire range of variation of the duty cycle if this range is considerably wide. Accordingly, where the load varies over a relatively wide range, the known speed control apparatus is not sufficiently reliable to assure accurate regulation of the operating speed of the electrically controlled device by regulating the duty cycle of an electric current to be applied to the electrically operated member.

In view of the above drawback of the known speed control apparatus, the mass or moment of inertia of the electrically controlled device is increased to reduce the range of variation of the load to be applied to the device and thereby improve the speed control accuracy by regulation of the duty cycle of the electrically operated member. However, this solution gives rise to an increase in the cost of manufacture of the electrically controlled device.

SUMMARY OF THE INVENTION

It is therefore an object of the present invention to provide an inexpensive speed control apparatus which is capable of accurately controlling the operating speed of an electrically controlled device by controlling the duty cycle of an electric current to be applied to an electrically operated member of the device.

The above object may be achieved according to the principle of the present invention, which provides a speed control apparatus for controlling an operating speed of an electrically controlled device which includes an electrically operated member, comprising: (a) an error signal generator for generating an error signal indicative of an error between an actual and a target value of the operating speed; (b) a reference signal generator for generating a reference signal; (c) a comparator connected to the error and reference signal generators, and generating an output signal determined based on a result of comparison of the error signal with the reference signal; (d) an energy control device connected between the comparator and the electrically operated member, and operated for controlling an energy supplied to the electrically controlled device, by controlling a duty cycle of an electric current applied to the electrically operated member according to the output signal of the comparator; and (e) reference changing means, connected to the reference signal generator. The reference changing means is adapted to change the reference signal depending upon a load currently applied to the electrically controlled device.

For example, the load applied to the electrically controlled device is changed when a clutch for connecting the electrically operated member to a driven member is disengaged. In this case, a variation in the load may be sensed by monitoring the operating state of the clutch, and the reference changing means may change the reference signal depending upon a control signal for engaging and disengaging the clutch. Thus, any signal indicative of a variation in the load may be used by the reference changing means for changing the reference signal, so that the changed reference signal corresponds to the currently applied load. If such a signal indicative of a variation in the load is not available, a load sensor may be provided for detecting the load currently applied to the electrically controlled device, so that an output signal of the load sensor is applied to the reference changing means However, the reference changing means need not change the reference signal in exact proportion to the amount of load currently applied. As described below in detail, the reference signal is changed or modified to narrow the required operating range of the error signal generator and other components of the speed control apparatus. Therefore, the speed control accuracy of the apparatus can be improved even if the reference signal is changed in two steps depending upon the amount of load applied to the electrically controlled device.

Where the error signal generator is adapted to generate an AC signal, the reference signal generator is generally adapted to generate an AC signal such as a signal having a triangular waveform In this case, the reference changing means is preferably adapted to change both of the amplitude and the average value of the AC reference signal generated by the reference signal generator. However, only one of the amplitude and average value may be changed. Further, the reference signal generator may be adapted to generate a DC reference signal.

In the speed control apparatus of the present invention constructed as described above, the error signal indicative of an error between the actual and target values of the operating speed of the electrically controlled device is generated by the error signal generator. This error signal is compared with the reference signal, by the comparator, which in turn generates the output signal determined according to the result of the comparison. The output signal is applied to the energy control device, so that the duty cycle of the electric current to be applied to the electrically operated device is controlled according to the output signal of the comparator, so as to regulate the amount of energy supplied to the electrically controlled device, whereby the operating speed of the electrically controlled device is controlled.

More specifically described, while the amount of variation of the load applied to the electrically controlled device is relatively small, the energy supplied to the electrically controlled device is changed by an amount suitable for zeroing the error between the actual and target values of the operating speed. Namely, the actual operating speed is controlled for exact coincidence with the target value. When the load applied to the device is changed by a relatively large amount, the reference changing means is operated to change the reference signal depending upon the currently applied load, so that the energy supplied to the device is accordingly changed, without the error signal being changed. Consequently, the error or deviation of the actual operating speed from the desired or target value can be prevented from significantly increasing with a change in the load, even if the load is considerably changed.

Since the required operating range of the error signal generator can be held relatively narrow owing to the appropriate change of the reference signal by the reference changing means, the error signal generator is able to accurately operate to attain its assigned function, for enabling the speed control apparatus to maintain the operating speed of the electrically controlled device exactly at the target value, even where the amount of load applied to the device is varied over a relatively wide range.

It will be understood from the above explanation that the reference signal, which is held constant in the known apparatus, is appropriately changed to change the energy supplied to the electrically controlled device, when the load applied to the device is considerably changed. This arrangement avoids a considerable change in the error signal, and thereby prevents appreciable reduction in the speed control accuracy of the apparatus, even when the electrically controlled device is subject to a considerable change in the load amount. Accordingly, the present speed control apparatus permits the operating speed of the electrically controlled device to be maintained exactly at the target level, irrespective of a change in the load applied to the device.

It is noted that an additional cost for providing the speed control apparatus with the reference changing means is greatly smaller than an additional cost required to increase the mass or moment of inertia of the device for narrowing the range of variation in the load. Hence, the total cost of manufacture of the speed control apparatus and electrically controlled device is significantly lowered when the speed control apparatus is constructed according to the present invention.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which.

DETAILED DESCRIPTION OF THE INVENTION

Figure 1:
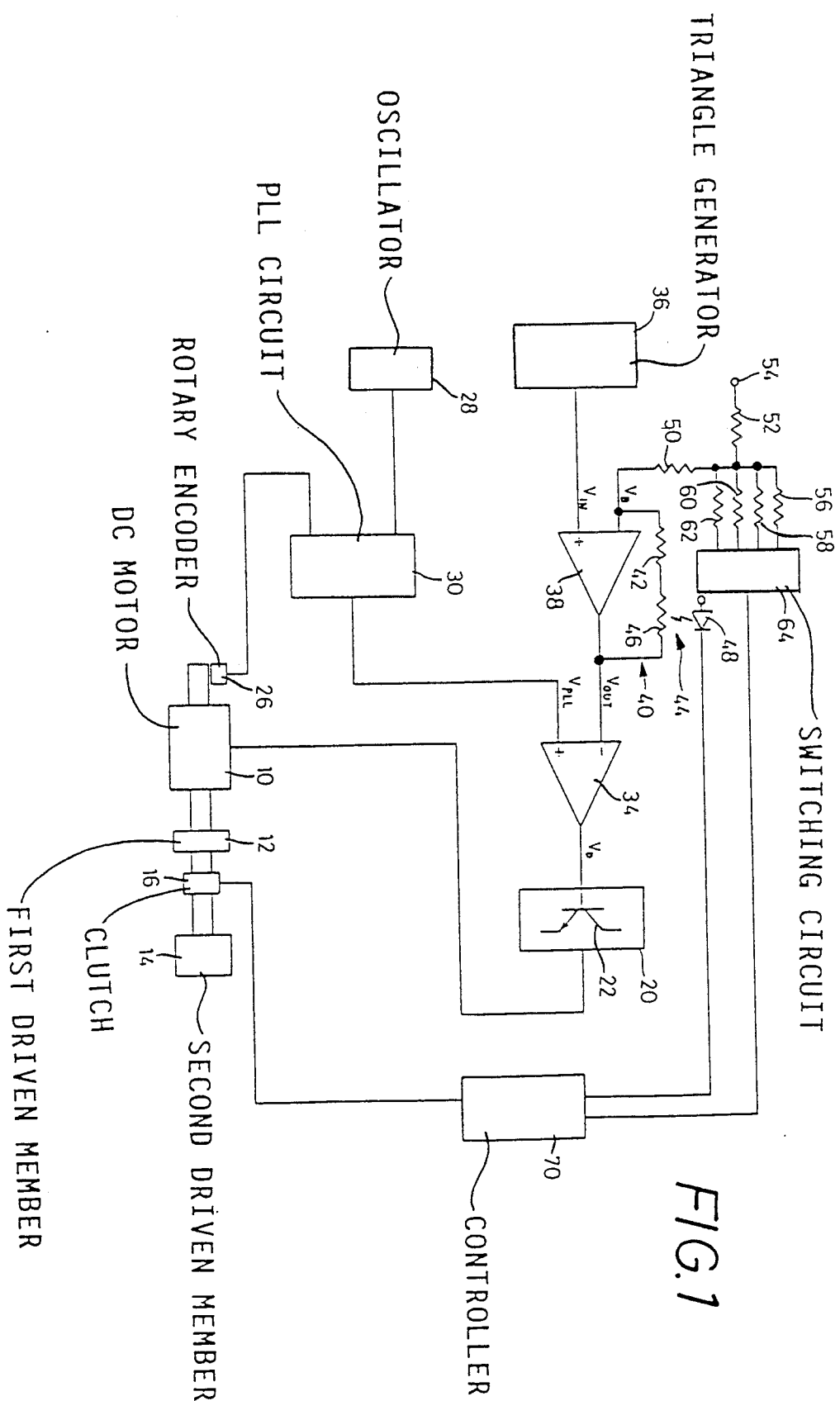
FIG. 1 is a schematic block diagram illustrating one embodiment of a speed control apparatus of this invention, in the form of an apparatus for controlling a DC motor such that the operating speed of the motor is maintained at a predetermined level.

Referring first to FIG. 1, reference numeral 10 denotes an electrically operated member in the form of a DC motor used in an electrically controlled device. In this device, the DC motor 10 is used as a drive source for driving a first and a second driven member 12, 14, and the operating speed of the motor 10 is controlled to be maintained at a predetermined constant level. The first driven member 12 is connected as a first load directly to the DC motor 10, while the second driven member 14 is connected as a second load to the motor 10 via a clutch 16. The clutch 16 is engaged and disengaged according to a control signal received from a controller 70 (which will be described).

The electrically controlled device 10, 12, 14, 16 is controlled by a speed control apparatus as illustrated in FIG. 1. The speed control apparatus includes an energy control device in the form of a power supply circuit 20. The DC motor 10 is operated with an electric current (in the form of a duty-controlled pulse) supplied from the power supply circuit 20. The power supply circuit 20 includes a power transistor 22 which is turned ON and OFF so as to determine the duty cycle of the electric current applied to the DC motor 10. Thus, the rotating speed of the DC motor 10 is controlled, and the operating speed of the electrically controlled device 10, 12, 14, 16 is controlled. In the present embodiment, the operating speed of the device is considered the rotating speed of the motor 10.

The DC motor 10 is provided with a speed signal generator in the form of a rotary encoder 26 adapted to detect the rotating speed of the motor. The rotary encoder 26 generates an AC signal whose frequency is proportional to the rotating speed of the motor 10. The rotary encoder 26 cooperates with an oscillator 28 and a phase-locked loop (PLL) circuit 30, to constitute an error signal generator which generates an error signal indicative of an error or difference between the currently detected actual rotating speed of the motor 10 and a predetermined target or desired value. More specifically, the rotary encoder 26 and the oscillator 28 are connected to respective inputs of the PLL circuit 30. The oscillator 28 may be an RC oscillator (resistance-capacitance oscillator), or a crystal oscillator. The PLL circuit 30 compares the frequency of the output signal of the rotary encoder with that of the output signal of the oscillator 28, and produces an error signal in the form of a voltage signal $V_{PLL}$ corresponding to a difference between the frequencies of the output signals of the encoder 10 and oscillator 28. In other words, the error or voltage signal $V_{PLL}$ is indicative of an error between the actual and target values of the speed of the DC motor 10.

The PLL circuit 30 is connected to an input of a comparator 34, which also receives at another input thereof a signal $V_{OUT}$ from a negative-feedback amplifier 38 connected to a triangle generator 36. This triangle generator 36 generates an output signal $V_{IN}$ which has a triangular waveform. The output signal $V_{IN}$ received by an input of the amplifier 38 is amplified by the same. The amplified signal or output signal $V_{OUT}$ of the amplifier 38 is applied to the comparator 34, which compares the output signals $V_{PLL}$ and $V_{OUT}$ of the PLL circuit 30 and amplifier 38 with each other. The comparator 34 produces an output signal $V_D$ whose level is high while the level of the signal $V_{PLL}$ is higher than that of the signal $V_{OUT}$ ($V_{PLL} > V_{OUT}$).

The negative-feedback amplifier 38 is provided with a negative-feedback circuit 40 which includes a fixed resistor 42, and a cadmium sulfide photoconductive cell 46 connected in series with the fixed resistor 42. This cadmium sulfide photoconductive cell 46 cooperates with a light emitting diode 48 (light-emitting element) to constitute a photocoupler 44. The cell 46 is exposed to a light emitted by the diode 48. As the output of the diode 48 (amount of the light emitted by the diode 48) is increased, the electrical resistance of the cell 46 is lowered, and the gain of the amplifier 38 is reduced.

The amplifier 38 has a negative-feedback terminal connected to the resistor 42 and the cadmium sulfide photoconductive cell 46. The negative-feedback terminal is also connected to a high-level terminal 54 of a high-voltage power circuit, through two fixed resistors 50, 52, and receives a bias voltage $V_B$. The fixed resistors 50, 52 are connected to four fixed resistors 56, 58, 60, 62. These fixed resistors 56, 58, 60, 62 are selectively connected to the earth through respective switches provided in a switching circuit 64, whereby the bias voltage $V_B$ is changed.

The photocoupler 44 (light emitting diode 48) and the switching circuit 64 are controlled by the controller 70, which also controls the clutch 16 as indicated above. When a control signal for placing the clutch 16 in the engaged position is generated from the controller 70, the second driven member or load 14 is connected from the DC motor 10, and the load applied to the motor 10 is relatively large. When a control signal for releasing the clutch 16 is present, the second driven member 14 is disconnected from the motor 10, and the load of the motor 10 is relatively small. In the relatively low load condition of the motor 10 with the clutch 16 disengaged, the controller 70 lowers the output of the light emitting diode 48 to increase the gain of the negative-feedback amplifier 38, and controls the switching circuit 64 for increasing the total electrical resistance of the four fixed resistors 56, 58, 60 62 to increase the bias voltage $V_B$. The four resistors 56, 58, 60, 62 have the same electrical resistance value and the total electrical resistance and the level of the bias voltage $V_B$ may be changed in five steps depending upon the number of the resistors which are connected to the earth by the switching circuit 64. However, the resistors 56, 58, 60, 62 may have different electrical resistance values, so that different combinations of the resistors provide respective total resistance values and respective levels of the bias voltage $V_B$. In this case, the number of steps in which the bias voltage may be changed is increased.

In the present example in which the load of the DC motor 10 is changed in only two steps depending upon the operating position of the clutch 16, and the output of the diode 48 and the total resistance value of the resistors 56, 58, 60, 62 are changed in two steps depending upon the selected one of the two positions (engaged and released or disengaged positions) of the clutch 16. However, the output of the diode 48 and the total resistance value of the resistors 56, 58, 60, 62 may be changed in three or more steps, as described above.

Figure 2:
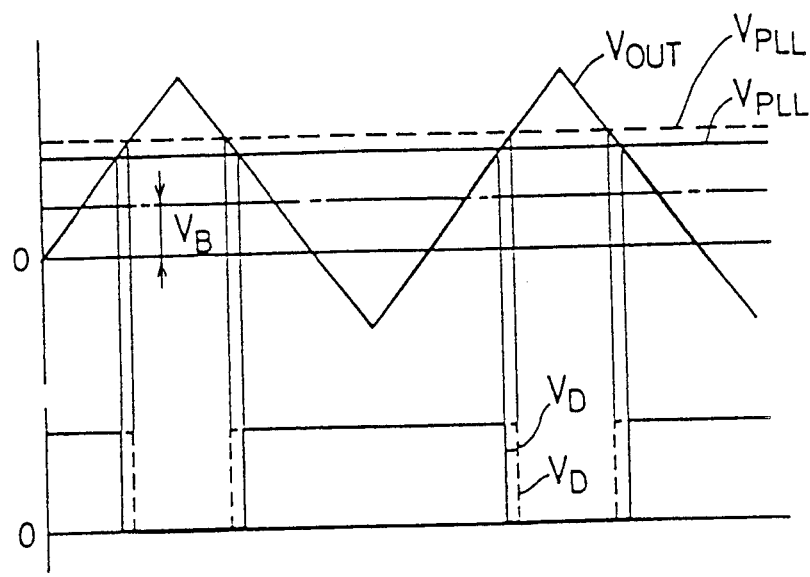
FIGS. 2 and 3 are views for explaining an operation of the speed control apparatus of FIG. 1.
Figure 3:
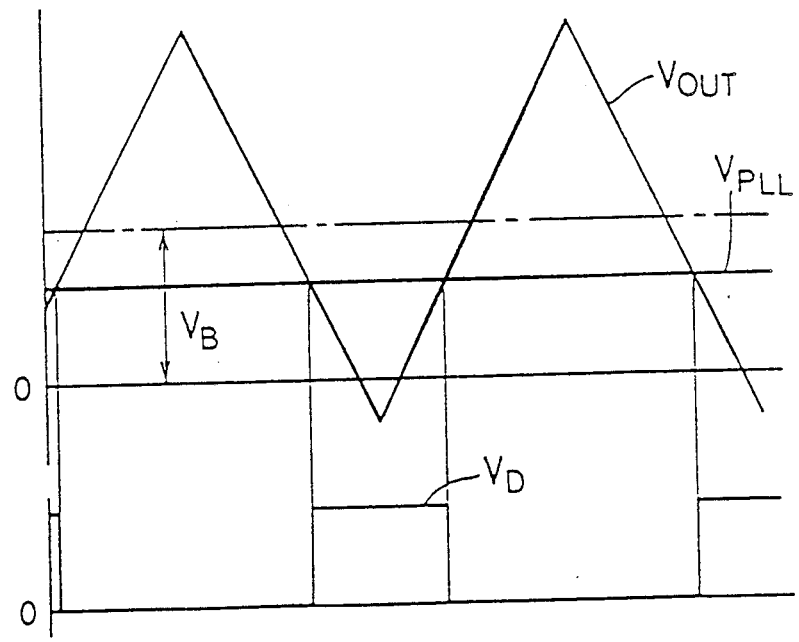

Referring also to FIGS. 2 and 3, there will be described an operation of the present speed control apparatus.

When the clutch 16 is engaged to connect the second driven member or load 14 to the DC motor 10, the load of the motor 10 is increased. In this high-load condition, the output signal $V_{OUT}$ of the negative-feedback amplifier 38 has a waveform as shown in FIG. 2. When the clutch 16 is disengaged to disconnect the second driven member 14 from the motor 10, the load of the motor 10 is relatively low. In this low-load condition, the output signal $V_{OUT}$ has a waveform as shown in FIG. 3.

In the high-load condition, a relatively high voltage is applied from the controller 70 to the light emitting diode 48 to increase the intensity of the light irradiating the cadmium sulfide photoconductive cell 46, whereby the electrical resistance of the cell 46 is reduced to reduce the gain of the amplifier 38. As a result, the amplitude of the triangular waveform of the output signal $V_{OUT}$ is decreased. At the same time, the controller 70 controls the switching circuit 64 so as to reduce the total electrical resistance value of the four fixed resistors 56, 58, 60, 62, to thereby lower the bias voltage $V_B$ of the amplifier 38 (to decrease the average value of the signal $V_{OUT}$). As a result, the output signal $V_D$ of the comparator 34 has a relatively large pulse width or duration, as indicated in solid line in the lower part of FIG. 2. In response to this pulse signal $V_D$, the power transistor 22 of the power supply circuit 20 is held ON for a time period corresponding to the pulse duration of the signal $V_D$. Accordingly, the duty cycle of the electric current supplied from the circuit 20 to the DC motor 10 is increased.

The speed of the DC motor 10 is maintained substantially at the nominal or target value as long as the frequency of the output signal of the rotary encoder 26 is almost equal to the frequency of the output signal of the oscillator 28, which is indicative of the target speed. For the sake of explanation, it is assumed that the output signal $V_{PLL}$ of the PLL circuit 30 and the output signal $V_D$ of the comparator 34 in this condition are as shown in solid lines in FIG. 2.

If the load of the DC motor 10 is increased for some reason or other, the speed of the DC motor 10 is lowered, and the period of the output signal of the rotary encoder 26 exceeds that of the oscillator 28. Consequently, the level of the error signal $V_{PLL}$ produced by the PLL circuit 30 is raised by an amount corresponding to the increase in the period of the output signal of the rotary encoder 26, as indicated in dashed line in FIG. 2. Accordingly, the duration of the pulse signal $V_D$ produced by the comparator 34 is increased, as also indicated in dashed line in FIG. 2. As a result, the duty cycle of the electric current to be supplied from the power supply circuit 20 to the motor 10 is increased, whereby the energy given to the motor 10 is increased, and the operating speed of the motor 10 is accordingly increased. Therefore, the period of the output signal of the rotary encoder 26 is eventually made substantially equal to that of the oscillator 28, and the error signal $V_{PLL}$ (output signal of the PLL circuit 30) is thereafter kept constant to maintain the rotating speed of the motor 10 substantially at the target value.

When the load of the DC motor 10 is slightly reduced, the level of the output signal $V_{PLL}$ of the PLL circuit 30 is accordingly lowered from the level indicated in solid line in FIG. 2, and the pulse duration of the output signal $V_D$ of the comparator 34 is accordingly reduced to reduce the duty cycle of the current applied to the DC motor 10, by an amount corresponding to a decrease in the load, whereby the speed of the motor 10 is maintained substantially at the target level.

If the clutch 16 is disengaged and the load of the motor 10 is considerably reduced, the controller 70 controls the light emitting diode 48 and the switching circuit 64 so that the output of the diode 48 is reduced to increase the gain of the amplifier 38, while the total resistance value of the resistors 56, 58, 60, 62 is increased to increase the bias voltage $V_B$ of the amplifier 38, as indicated in FIG. 3.

In the above condition, the pulse duration of the signal $V_D$ of the comparator 34 is considerably reduced, even if the output voltage $V_{PLL}$ of the PLL circuit 30 is held at the same level as indicated in solid line in FIG. 2. Accordingly, the duty cycle of the electric current supplied from the power supply circuit 20 to the DC motor 10 is considerably reduced, and the energy supplied to the motor 10 is reduced by an amount corresponding to a decrease in the load. As a result, the speed of the motor 10 is maintained substantially at the target level, irrespective of a considerable decrease in the load of the motor 10. Therefore, the frequency (period) of the output signal of the rotary encoder 26 becomes substantially equal to that of the oscillator 28, and the level of the error signal $V_{PLL}$ from the PLL circuit 30 is held substantially constant.

As described above, when the second driven member or load 14 is disconnected from the DC motor 10, the gain and bias voltage $V_B$ of the negative-feedback amplifier 38 are changed, so that the amount of the electric current applied to the motor 10 is commensurate with the reduced load. This arrangement prevents a considerable change in the level of the error signal $V_{PLL}$ even when the load of the motor is greatly changed. If the gain and bias voltage $V_B$ of the amplifier 38 were held unchanged as in the conventional speed control arrangement, the level of the error signal $V_{PLL}$ of the PLL circuit 30 should be considerably changed to greatly change the amount of the electric current applied to the motor 10, in order to prevent a change in the operating speed of the motor 10 upon a considerable change in the motor load. However, it is not easy to arrange the PLL circuit 30 so that the level of the error signal $V_{PLL}$ is accurately proportional to the difference between the frequencies (periods) of the rotary encoder 26 and oscillator 28. This means that the conventional arrangement suffers from difficulty in maintaining the speed of the DC motor 10 exactly at the target value when the load of the motor 10 is changed to a relatively large extent. According to the present speed control apparatus constructed and operated as described above, however, the reference signal $V_{OUT}$ with which the error signal $V_{PLL}$ is compared is changed depending upon the currently applied load, so that the speed of the motor 10 is maintained at the desired or target value, without the level of the error signal $V_{PLL}$ being considerably changed. Thus, the present speed control apparatus assures improved accuracy of controlling the speed of the motor 10, irrespective of a relatively large change in the load applied to the motor.

Further, the present arrangement is adapted to increase the gain of the amplifier 38 upon an increase in the load, so that the gradient of the triangular waveform of the output signal $V_{OUT}$ of the amplifier 38 is reduced. This results in an increase in the rate at which the pulse duration of the signal $V_D$ is changed per unit amount of change in the level of the error signal $V_{PLL}$. This is advantageous or desirable since the energy supplied to the motor 10 should be changed at a higher rate in the high-load operation of the motor 10, than in the low-load operation, so as to zero the difference between the actual and target speed values of the motor.

It will be understood from the foregoing description of the present embodiment that the rotary encoder 26, oscillator 28 and PLL circuit 30 constitute the error signal generator for generating the error signal $V_{PLL}$, and the triangle generator 36 and the negative-feedback amplifier 38 constitute a reference signal generator for generating the reference signal with which the error signal is compared by the comparator 34. Further, the photocoupler 44, fixed resistors 56, 58, 60, 62, switching circuit 64 and controller 70 serve as means for changing the reference signal $V_{OUT}$ depending upon the load currently applied to the motor 10. Further, the power supply circuit 20 serves as the device for controlling the energy supplied to the motor 10, by controlling the duty cycle of the electric current applied to the motor 10 according to the output signal $V_D$ of the comparator 34.

In the present embodiment, the speed of the DC motor 10 as an electrically operated member is controlled. However, the principle of the invention is applicable to a speed control apparatus for controlling the operating speed of a hydraulically operated device such as a hydraulic cylinder, by controlling the duty cycle of an electrically operated valve for controlling the hydraulic pressure or flow rate for operating the hydraulically operated device, for example.

Figure 4:
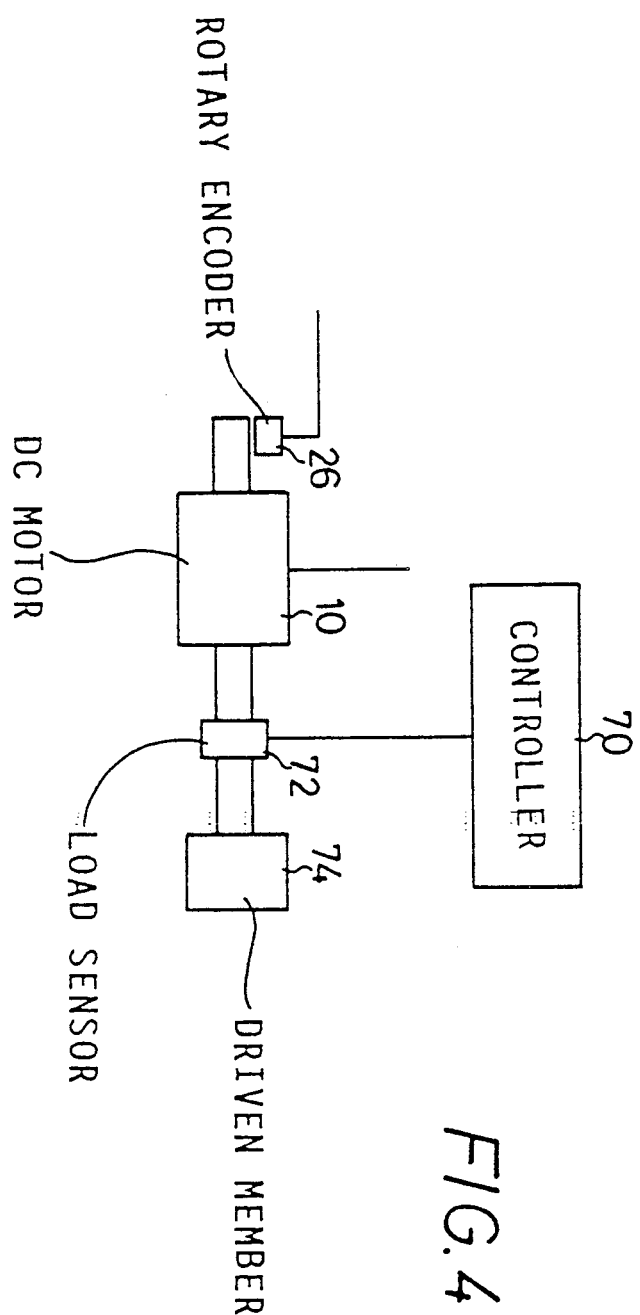
FIG. 4 is a schematic view illustrating a part of a speed control apparatus constructed according to another embodiment of the invention.

Referring next to FIG. 4, there is shown a part of a modified embodiment of the speed control apparatus of the present invention, wherein a load sensor 72 is disposed between the DC motor 10 and a driven member or load 74. The load sensor 72 generates a signal indicative of the load currently applied to the motor 10, which is applied to the controller 70 as provided in the preceding embodiment. That is, the present modified arrangement is different from the preceding embodiment in that the controller 70 controls the photocoupler 44 and the switching circuit 64, according to the output signal received from the load sensor 72.

While the present invention has been described in its presently preferred embodiments with a certain degree of particularity, it is to be understood that the invention may be embodied with various changes, modifications and improvements, which may occur to those skilled in the art, without departing from the spirit and scope of the invention defined in the following claims. For instance, the oscillator 28 may be adapted such that the frequency of the signal generated by the oscillator can be changed as desired, so that the target value of the operating speed of the motor 10 can be accordingly changed.

What is claimed is:

1. A speed control apparatus for controlling an operating speed of an electrically controlled device which includes an electrically operated member, comprising:
    an error signal generator for generating an error signal indicative of an error between an actual and a target value of said operating speed;
    a reference signal generator for generating a reference signal;
    a comparator connected to said error and reference signal generators, and generating an output signal determined based on a result of comparison of said error signal with said reference signal;
    an energy control device connected between said comparator and said electrically operated member, and operated for controlling an energy supplied to said electrically controlled device, by controlling a duty cycle of an electric current applied to said electrically operated member according to said output signal of said comparator; and
    reference changing means, connected to said reference signal generator, for changing said reference signal depending upon a load currently applied to said electrically controlled device.

2. A speed control apparatus according to claim 1, wherein said error signal generator comprises:
    a speed signal generator for generating an AC signal whose frequency is proportional to said actual value of said operating speed of said electrically operated member;
    an oscillator for generating a signal having a predetermined frequency; and
    error signal output means for generating as said error signal a signal corresponding to a difference between the frequencies of said signals generated by said speed signal generator and said oscillator.

3. A speed control apparatus according to claim 2, wherein said error signal output means comprises a phase-locked loop circuit responsive to said signals generated by said speed signal generator and said oscillator.

4. A speed control apparatus according to claim 1, wherein said error signal generator generates as said error signal a DC signal whose level is proportional to said error between said actual and target values of said operating speed, and said reference signal generator generates as said reference signal an AC signal, said comparator generating said output signal whose level varies in two steps depending upon whether the level of said error signal is higher than that of said reference signal.

5. A speed control apparatus according to claim 4, wherein said reference signal generator comprises a triangle generator which generates a signal having a triangular waveform.

6. A speed control apparatus according to claim 4, wherein said reference changing means changes both of an amplitude and an average value of said AC signal generated as said reference signal by said reference signal generator.

7. A speed control apparatus according to claim 1, wherein said reference signal generator comprises a triangle generator which generates a signal having a triangular waveform, and an amplifier which amplifies said signal generated by said triangle generator, said reference changing means comprising at least one of gain changing means for changing a gain of said amplifier, and bias voltage changing means for changing a bias voltage to be applied to said amplifier.

8. A speed control apparatus according to claim 7, wherein said reference signal generator comprises a feedback circuit which is connected to said amplifier and which includes resistor means, and said gain changing means comprises resistance changing means for changing an electrical resistance of said resistor means.

9. A speed control apparatus according to claim 8, wherein said resistor means comprises a light-sensitive element whose electrical resistance varies with an amount of a light received thereby, and said resistance changing means includes a light-emitting element disposed adjacent to said light-sensitive element for exposing said light-sensitive element, and a control circuit for controlling an output of said light-emitting element according to the load currently applied to said electrically operated member.

10. A speed control apparatus according to claim 9, wherein said light-sensitive element consists of a cadmium sulfide cell provided in a negative feedback circuit connected as said feedback circuit to said amplifier, and said light-emitting element consists of a light emitting diode, said control circuit increasing said output of said light emitting diode and thereby reducing said gain of said amplifier as said load increases.

11. A speed control apparatus according to claim 7, wherein said reference signal generator comprises a feedback circuit connected to said amplifier, and wherein said bias voltage changing means comprises:
   a high-voltage power source;
   a first and a second resistor connected in series with each other between said feedback circuit and said high-voltage power source; and
   variable-resistor means connected between an earth and a point of connection of said first and second resistors.

12. A speed control apparatus according to claim 11, wherein said variable-resistor means includes:
   a plurality of third resistors connected in parallel with each other;
   switching means connected in series with each other of said plurality of third resistors; and
   a control circuit for controlling said switching means for selectively connecting at least one of said plurality of third resistors to the earth and thereby changing a total electrical resistance of said third resistors, to change said bias voltage.

13. A speed control apparatus according to claim 12, wherein said plurality of third resistors consist of at least three fixed resistors having different electrical resistance values, and said switching means consists of at least three switches corresponding to said at least three fixed resistors, said control circuit selectively closing different combinations of said at least three switches depending upon said load currently applied to said electrically operated member.

14. A speed control apparatus according to claim 1, wherein said reference changing means changes said reference signal depending upon a control signal which causes a change in said load currently applied to said electrically operated member.

15. A speed control apparatus according to claim 14, wherein said electrically controlled device includes a drive source as said electrically operated member, a driven member driven by said drive source, and a clutch disposed between said drive source and said driven member, and said reference changing means includes control means for generating a signal for changing said reference signal depending upon a clutch control signal generated as said control signal by said control means to engage and disengage said clutch.

16. A speed control apparatus according to claim 1, wherein said reference changing means includes a load sensor for generating an output signal indicative of said load currently applied to said electrically operated member, and changes said reference signal depending upon said output signal of said load sensor.

17. A speed control apparatus according to claim 1, wherein said electrically controlled device includes an electric motor as said electrically operated member, and said error signal generator comprises:
   a speed signal generator for generating an AC signal whose frequency varies with a rotating speed of said electric motor;
   an oscillator for generating a signal having a predetermined frequency; and
   error signal output means for generating as said error signal a signal representative of a difference between the frequencies of said signals generated by said speed signal generator and said oscillator.

18. A speed control device according to claim 17, wherein said oscillator consists of an oscillator for generating a signal having a constant frequency which corresponds to a fixed target value at which said rotating speed of said electric motor is maintained by the present control device.

19. A speed control device according to claim 17, wherein said oscillator consists of an oscillator for generating a signal whose frequency is variable to change a variable target value of said rotating speed of said electric motor.

* * * * *